(12) United States Patent
Poland

(10) Patent No.: US 7,037,264 B2
(45) Date of Patent: May 2, 2006

(54) ULTRASONIC DIAGNOSTIC IMAGING WITH STEERED IMAGE PLANE

(75) Inventor: McKee Dunn Poland, Andover, MA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 577 days.

(21) Appl. No.: 10/448,518

(22) Filed: May 30, 2003

(65) Prior Publication Data

US 2003/0208124 A1 Nov. 6, 2003

Related U.S. Application Data

(63) Continuation-in-part of application No. 10/437,834, filed on May 12, 2003, which is a continuation-in-part of application No. 10/231,704, filed on Aug. 29, 2002, which is a continuation-in-part of application No. 09/641,306, filed on Aug. 17, 2000, now Pat. No. 6,443,896.

(51) Int. Cl.
*A61B 8/02* (2006.01)

(52) U.S. Cl. ........................................ 600/447; 600/459
(58) Field of Classification Search ................ 600/447, 600/437, 449, 461, 459, 439
See application file for complete search history.

(56) References Cited

U.S. PATENT DOCUMENTS

| | | | |
|---|---|---|---|
| 5,090,414 A | * | 2/1992 | Takano .................... 600/461 |
| 5,454,371 A | | 10/1995 | Fenster et al. |
| 5,546,807 A | | 8/1996 | Oxaal et al. |
| 5,715,823 A | * | 2/1998 | Wood et al. ............... 600/437 |
| 5,928,151 A | | 7/1999 | Hossack et al. |
| 5,997,479 A | * | 12/1999 | Savord et al. ............. 600/447 |
| 6,019,724 A | * | 2/2000 | Gronningsaeter et al. ... 600/439 |
| 6,093,150 A | * | 7/2000 | Chandler et al. .......... 600/459 |
| 6,241,675 B1 | | 6/2001 | Smith et al. |
| 6,276,211 B1 | | 8/2001 | Smith |
| 6,436,048 B1 | * | 8/2002 | Pesque .................... 600/447 |
| 6,443,896 B1 | | 9/2002 | Detmer |

FOREIGN PATENT DOCUMENTS

EP       1 167 996 A       1/2002

* cited by examiner

*Primary Examiner*—Dennis W. Ruhl
*Assistant Examiner*—Ruby Jain
(74) *Attorney, Agent, or Firm*—W. Brinton Yorks, Jr.

(57) ABSTRACT

A two-dimensional array transducer probe is used to image regions of the body that are acoustically obstructed from conventional view by objects such as the lungs or ribs. The probe is located against the body at an acoustic window which provides acceptable ultrasonic transmissivity between the transducer array and the body. While maintaining the probe at its acoustic window, an image plane location is manipulated by adjusting the beam steering directions. The image plane can be tilted in the elevation direction, moved laterally, and/or rotated about a center axis to position the image plane so that the obstructed anatomy is effectively imaged for diagnosis.

14 Claims, 5 Drawing Sheets

ULTRASONIC DIAGNOSTIC IMAGING WITH STEERED IMAGE PLANE

This is a continuation in part application of U.S. patent application Ser. No. 10/437,834, filed May 12, 2003, which is a continuation in part application of U.S. patent application Ser. No. 10/231,704, filed Aug. 29, 2002, which is a continuation in p art application of U.S. patent application Ser. No. 09/641,306, filed Aug. 17, 2000 and now U.S. Pat. No. 6,443,896.

This invention relates to ultrasonic diagnostic imaging, and more particularly, to ultrasound systems that enable the image plane to be steered while maintaining a good acoustic window for the probe.

Medical diagnostic imaging systems produce highly diagnostic images of soft tissue of the body. However, tissue and organs which need to be observed are frequently obscured by parts of the body which are not highly transmissive of ultrasound such as bones and the air-filled lungs. An example of such a situation is shown in FIG. 1. In this illustration the heart 100, shown in partial outline behind the rib cage 110,112, is located behind the left side of the rib cage. Outlined within the heart and cross-hatched is the left ventricle 102 of the heart 100, which is frequently the subject of ultrasonic diagnosis for the assessment of cardiac function. The left ventricle can be accessed transthoracically for ultrasonic imaging by scanning the heart from between the ribs 110,112 for adult patients. The ultrasound beams access the heart through an intercostals space 122 between the ribs 110,11. The probe 10 scans the heart from the heart apex 104 as indicated by the outline 120 of the image sector scanned by the probe 10. This technique may be ineffective for some pediatric patients because the intercostals space may be too small. The technique may also be ineffective for some adult patients where the intercostals spaces suitable for beam passage do not allow the probe to be angled for access to the region of the heart which must be imaged. When these problems arise other approaches must be tried, such as scanning upward to the heart from below the lowest rib 112. However this requires that the probe be tilted against the body to aim the image plane upward to the heart while maintaining sufficient physical contact with the skin so that a good acoustic window is maintained between the probe and the skin. These demands are frequently in conflict, so that it can become impossible to aim the image plane in the desired direction while maintaining proper contact with the skin for acoustic transmission into the body. Another solution to this difficulty is to image the heart from the esophagus by use of a transesophageal echocardiography (TEE) probe. While affording excellent acoustic access to the heart by reason of the absence of any intervening rib structure, this is an invasive procedure requiring great care and which often causes patient discomfort as the TEE probe is inserted and retracted from the patient's throat. Accordingly it would be desirable to be able to image regions of the body which are difficult to access, maintaining good acoustic access to the body while obviating the need for complex imaging procedures.

In accordance with the principles of the present invention, an ultrasonic diagnostic imaging system and method are provided in which an image plane can be steered from an ultrasound probe without the need to physically relocate the probe against the skin of the patient. This permits the clinician to establish good acoustic contact with the body of the patient, then to scan the region of interest of the patient by steering the image plane without altering the acoustic window. The illustrated embodiments show image planes with multiple degrees of freedom so as to acquire the most diagnostically useful images of the region of interest under study.

Figure 1:
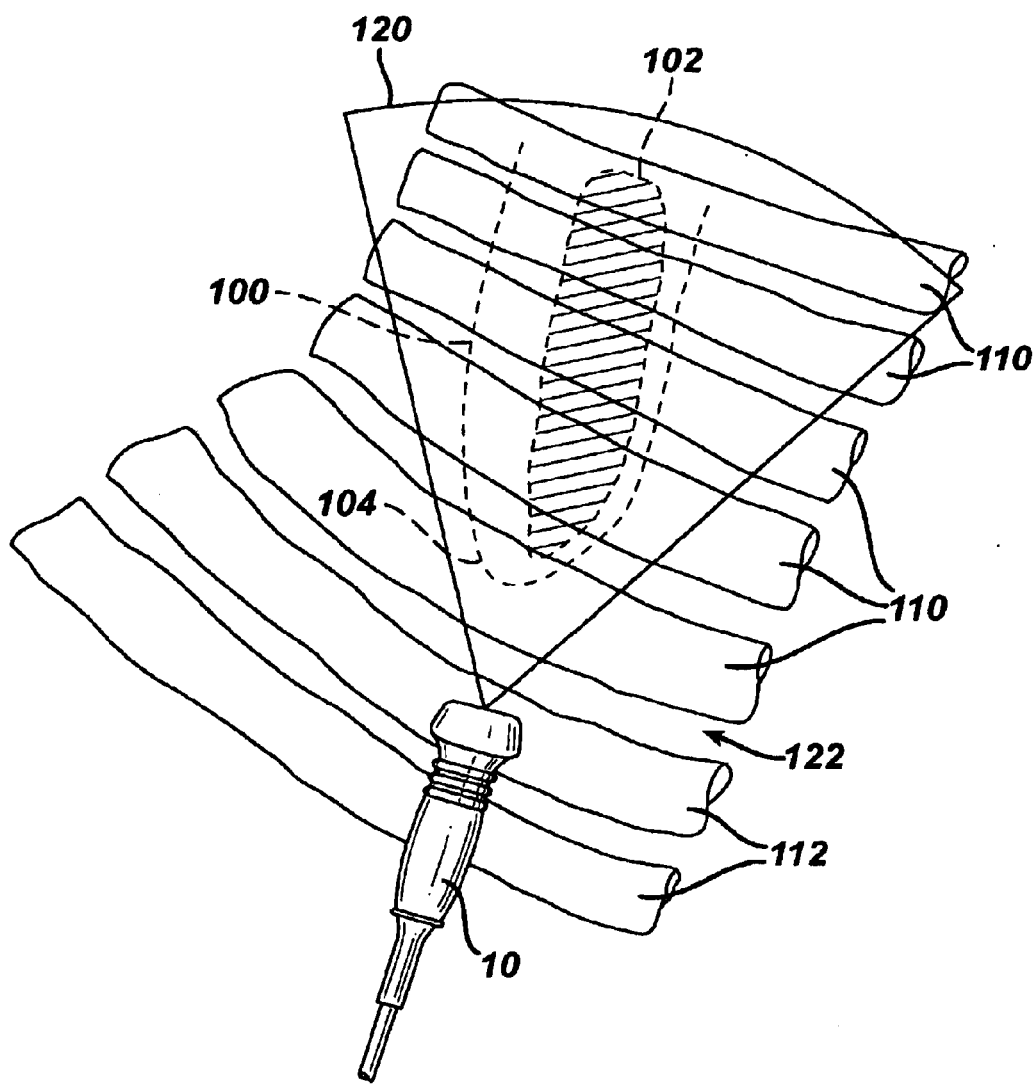
FIG. 1 illustrates intercostals scanning of the heart.
Figure 2C:
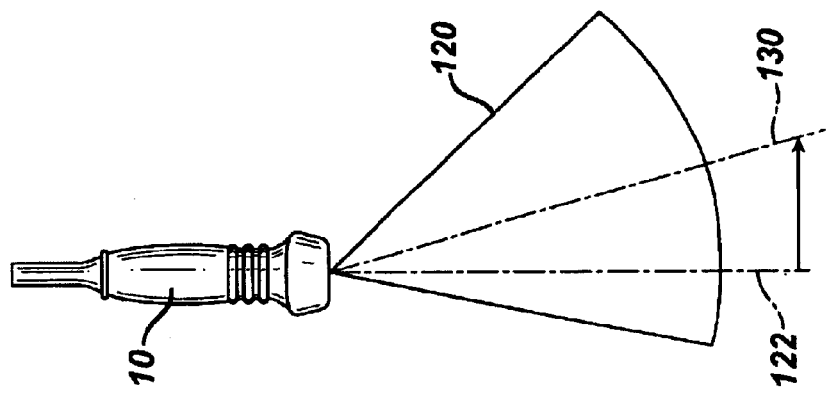
FIGS. 2a–2c illustrate numerous degrees of freedom of image plane adjustment.
Figure 2B:
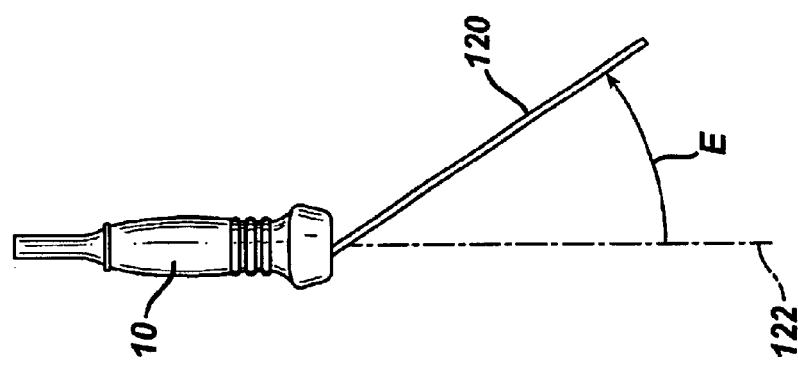
Figure 2A:
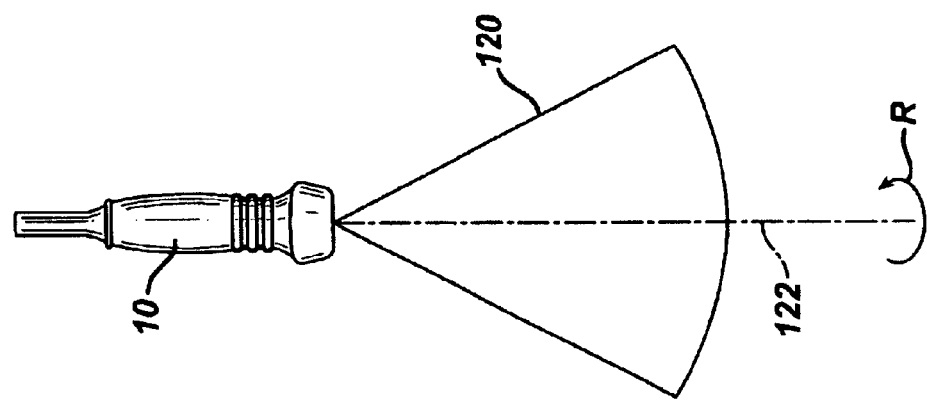

Referring to FIGS. 2a–2c, an ultrasound probe 10 is shown with several image plane adjustments in FIG. 2a the probe 10 is seen to scan a sector image 120. A conventional one-dimensional array transducer will scan a sector which is directly in front of the array transducer. That is, the sector plane is normal to the face of the probe 10 and evenly distributed on both sides of an axis 122 which is normal to the center of the transducer. A probe 10 of the present invention utilizes a two-dimensional array transducer with the elements of the array being controlled to transmit beams of an image in various directions through the volumetric region in front of the probe. This means, as discussed in further detail below, that the image plane 120 can be rotated around a scanline of the image or the normal axis 122 as indicated by the rotational arrow R. Thus, one degree of freedom which a probe of the present invention may exhibit is the ability to rotate the image plane around the center line or other scanline of the image.

In FIG. 2a the image plane 120 is depicted in the plane of the drawing. In FIG. 2b the image plane 120 is viewed orthogonal to the plane of the drawing, that is, the image plane is viewed "edge-on." If this were a conventional one-dimensional array probe, the image plane would be aligned with the center axis 122, extending normal to the face of the probe and transducer array. In accordance with this second embodiment of a probe of the present invention, the position of the image plane exhibits a second degree of freedom in which the image plane 120 can be steered in the elevation direction with respect to the nominal plane alignment with axis 122, as indicated by elevational arrow E. As used herein, elevation tilt or translation refers to an image plane orientation which is not co-planar with a reference plane such as the starting position of a plane change. The image plane 120 in FIG. 2b is tilted in the elevation dimension with respect to the position of the p lane of a conventional one-dimensional array probe.

In the third embodiment of FIG. 2c the image plane exhibits a third degree of freedom of translation. In this embodiment the image plane 120 is not centered about the axis 122, but is steered laterally as indicated by the lateral arrow L. In this position the center line 130 of the image is steered off of the normal probe axis 122 with the image plane 120 capturing lateral areas of the volumetric region which are outside of the area of the conventionally located image plane. This degree of freedom, where the position of an image does not change its plane but is steered in a different direction in the plane, is referred to herein as lateral tilt or translation.

Figure 2D:
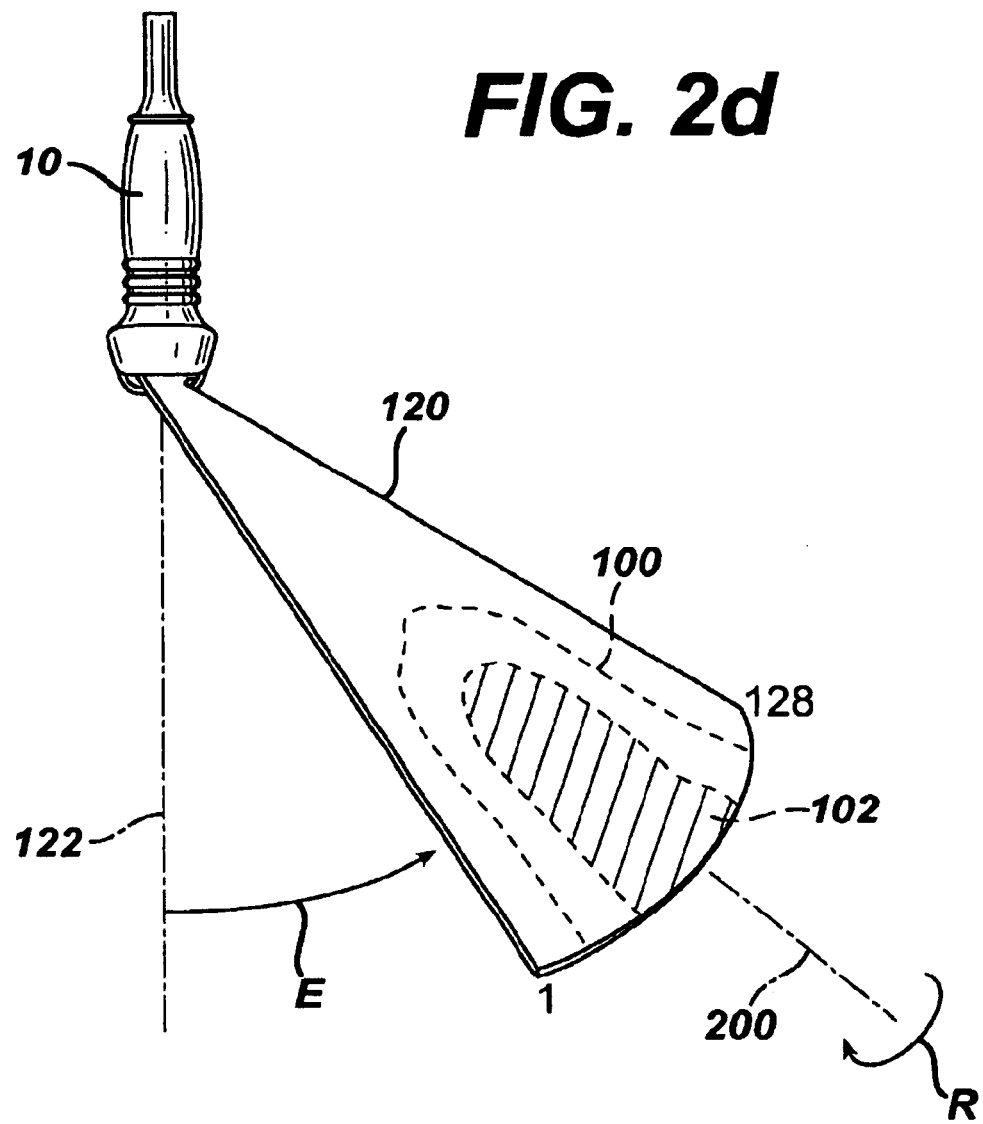
FIG. 2d illustrates an ultrasonic probe of the present invention with two degrees of freedom of image plane adjustment.

The embodiment of FIG. 2d illustrates a probe 10 scanning an image plane 120 which exhibits two degrees of freedom of translation. In this perspective view the image plane 120 has been elevated away from the normal axis 122 as indicated by the elevational arrow E. The image plane 120 has also been rotated about its center axis 200 as indicated by the rotational arrow R. Even though the probe is aimed in the direction of the normal axis 122, its image plane 120 is still able to capture the heart 100 and the left ventricle 102 in the image by reason of the steering of the image beams transmitted and received by the two dimensional array transducer of the probe 10.

It will be understood by those skilled in the art that the order of translation operations may be changed as well as their angular extent, to achieve different overall translations of the image plane 120 in three dimensional space. For example, image plane 120 may first be rotated about a central axis 122 by some rotation angle R, and then elevated away from that axis by angle E. The resulting position of image plane 120 is different than that shown in FIG. 2d. In general, by combining two or more rotation and elevation operations, any arbitrary image plane position may be realized, within the practical electro-acoustic beamforming limits of the ultrasound scanner 310. The translation operations may be combined into a single computational step by beamformer controller 312, so that the user is not aware of the geometric decomposition.

Although the scan lines of the image plane 120 are shown in the figures to have a common apex, other co-planar scan line arrangements are possible, such as rectangular or trapezoidal scan line patterns.

Figure 3:
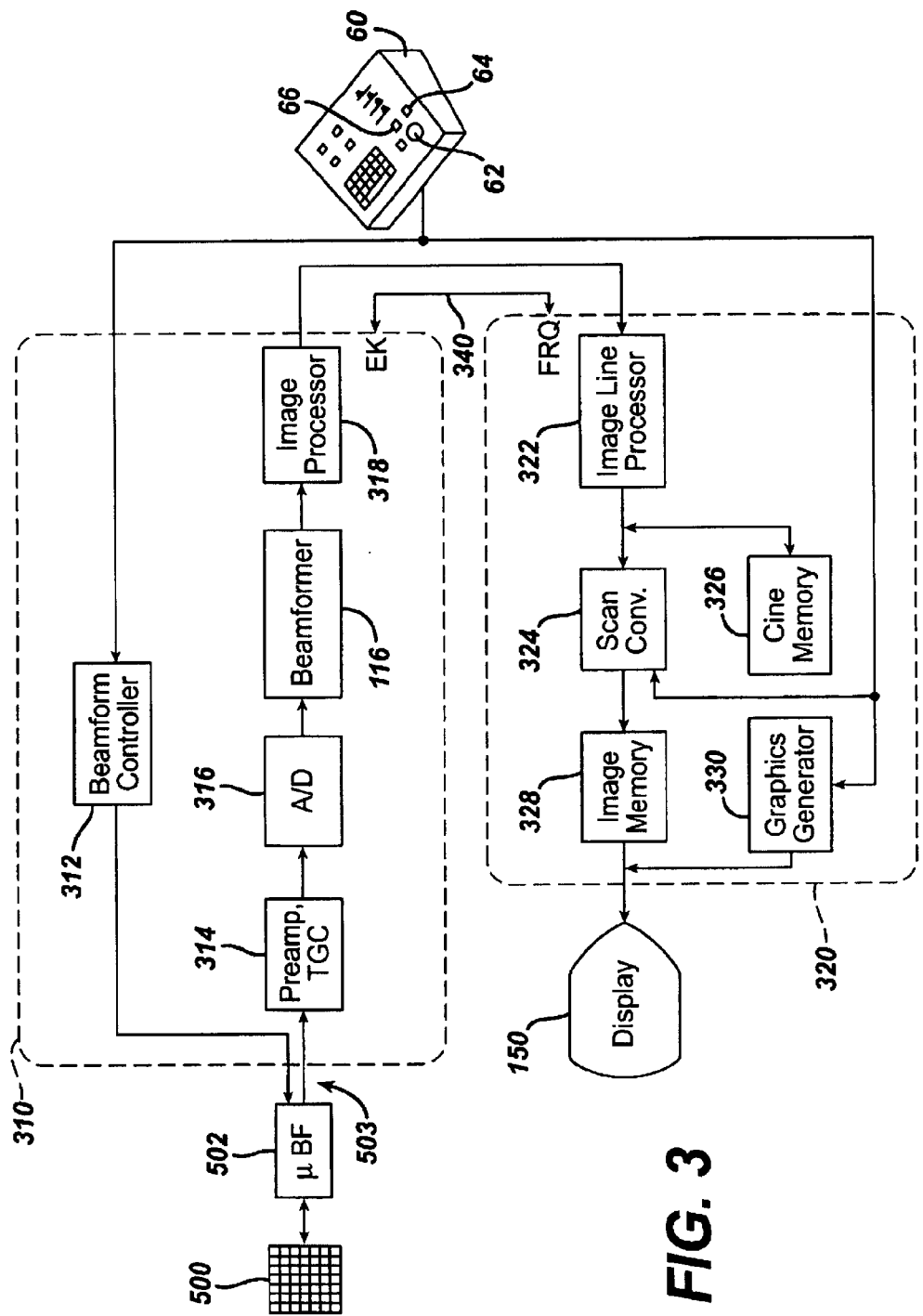
FIG. 3 illustrates an ultrasonic diagnostic imaging system constructed in accordance with the principles of the present invention.

FIG. 3 illustrates in block diagram form an ultrasound system constructed in accordance with the principles of the present invention. In this embodiment the probe 10 includes a two-dimensional array transducer 500 and a subarray processor or micro-beamformer 502. The microbeamformer contains circuitry which control the signals applied to groups of elements ("patches") of the array transducer 500 and does some processing of the echo signals received by elements of each group. Micro-beamforming in the probe advantageously reduces the number of conductors in the cable 503 between the probe and the ultrasound system and is described in U.S. Pat. No. 5,997,479 (Savord et al.) and in U.S. Pat. No. 6,436,048 (Pesque).

The probe 10 is coupled to the scanner 310 of the ultrasound system. The scanner includes a beamformer controller 312 which is responsive to a user control 60 and provides control signals to the microbeamformer 502 instructing the probe as to the timing, frequency, direction and focusing of transmit beams. The beamformer controller also controls the beamforming of received echo signals by its coupling to analog-to-digital (A/D) converters 316 and a beamformer 116. Echo signals received by the probe are amplified by preamplifier and TGC (time gain control) circuitry 314 in the scanner, then digitized by the A/D converters 316. The digitized echo signals are then formed into beams by a beamformer 116. The echo signals are processed by an image processor 318 which performs digital filtering, B mode detection, and Doppler processing, and can also perform other signal processing such as harmonic separation, speckle reduction through frequency compounding, and other desired image processing.

The echo signals produced by the scanner 310 are coupled to the digital display subsystem 320, which processes the echo signals for display in the desired image format. The echo signals are processed by an image line processor 322, which is capable of sampling the echo signals, splicing segments of beams into complete line signals, and averaging line signals for signal-to-noise improvement or flow persistence. The image lines are scan converted into the desired image format by a scan converter 324 which performs R-theta conversion as is known in the art. The image is then stored in an image memory 328 from which it can be displayed on a display 150. The image in memory is also overlayed with graphics to be displayed with the image, which are generated by a graphics generator 330 which is responsive to the user control for the input of patient identifying information or the movement of cursors, for example. Individual images or image sequences can be stored in a cine memory 326 during capture of image loops.

For real-time volumetric imaging the display subsystem 320 also includes the 3D image rendering processor (not shown) which receives image lines from the image line processor 322 for the rendering of a real-time three dimensional image which is displayed on the display 150.

In accordance with the principles of the present invention, the user interface 60 includes controls 62–66 for control of the orientation of the image plane scanned by the two dimensional array probe. When the user wants to rotate an image about its centerline the user does so by turning a control knob 66. The lateral and elevational steering of the image plane are both "tilt" modes for purposes of this embodiment. The user toggles between the elevational tilt mode and the lateral tilt mode by depressing tilt key 64 on the user interface 60. When the system is in the elevation tilt mode, the image plane can be manipulated as illustrated in FIG. 2b by rolling a trackball 62 to one side or the other. When the tilt key 64 is depressed the system switches to the lateral tilt mode and the user can move the image plane to the left or right laterally by manipulating the trackball 62.

As the user manipulates these controls, signals from the controls are coupled to the beamformer controller 312. The beamformer controller 312 responds to the user's selection of a new image plane orientation by programming the sequence of beams to be transmitted and received by the beamformer 116 or the microbeamformer 502 in a frame table. The beamformer controller reprograms a frame table for both images by recalculating or selecting the proper sequence of focusing coefficients for transmit and receive beamforming in the directions needed to scan the plane in the location specified by the user. The transmit beams are transmitted and focused in the desired directions through the volume in front of the transducer array 500 under control of a transmit beamformer in the microbeamformer 502 or the beamformer 116. FIG. 2d shows the beam at the left side of the image plane 120 labeled "1" and the beam at the right side of the image plane labeled "128." The data of the frame table causes the 128 beams of the image plane 120 to be transmitted, received and processed repetitively until the user changes the image plane orientation again or alters another imaging parameter. For instance, the user may be scanning blood flow in a color box in a particular area of the image, in which case Doppler ensembles will be transmitted to and received from the color box area for the processing and display of blood flow. The frame table contains the necessary data for the transmission and reception of the beams necessary to produce the desired image in the desired orientation.

The B mode echoes from each received scanline are processed by amplitude detection in the image processor 318, and the Doppler echo ensembles are Doppler processed in the image processor for the production of display signals depicting flow or tissue motion. The processed B mode and/or Doppler signals are then coupled to the display subsystem 320 for display.

The selection of the desired image planes is also coupled to the display subsystem 320, where the scan converter 324 and the graphics generator 330 are informed of the design of the images. This enables the scan converter to anticipate and then properly locate the Doppler information along the scanlines of a specified color box area, and enables the graphics generator to outline or highlight the color box if desired. The final image is then displayed on the display 150.

Figure 4:
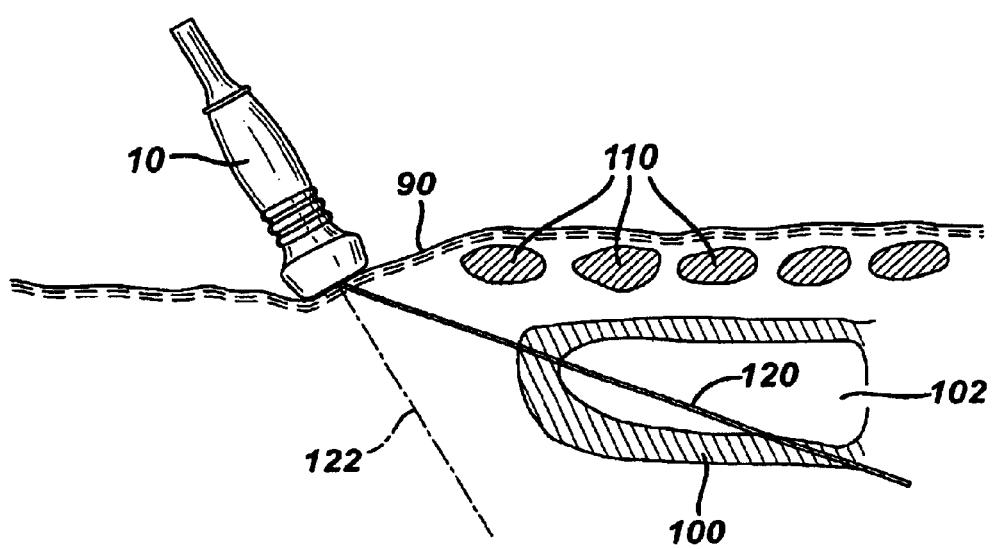
FIG. 4 illustrates a method of imaging the heart in accordance with the principles of the present invention.

FIG. 4 illustrates an application of the present invention for imaging the heart 100. Rather than image the heart transcostally through the ribs 110, the probe 10 is placed against the skin 90 of the abdomen below the ribs. The probe is generally coupled to the body by an acoustic couplant (a gel) which is spread over the skin 90. A good acoustic window is established when the image plane is imaging the interior of the body without obstruction of the ultrasonic waves. Usually the procedure will commence with the image plane directed in the conventional normal orientation to the probe, which is along axis 122 in the drawing. The probe is then held in place against the favorable acoustic window and the user interface is used to adjust the orientation of the plane. In this example the image plane 120 is tilted in the elevation direction so that it intersects the left ventricle 102 of the heart 100 which is below the ribs. The image plane may, if desired, be tilted laterally and/or rotated until it intersects the heart in the cross-section which is to be imaged. Thus, the clinician is able to acquire diagnostically useful images of an organ, the heart in this example, by manipulating the orientation of the image plane in the body while maintaining a favorable acoustic window with the body.

The present invention has particular utility for telemedicine, when a skilled diagnostician is not present at the patient's location. For instance, a medic can hold the ultrasound probe against the body of an accident victim who is suspected to have internal injuries or bleeding. The image data can be radioed or otherwise communicated to a facility where the image is displayed for a skilled diagnostician. The diagnostician can manipulate the user controls at his location, with the manipulation of the controls being communicated back to the ultrasound system at the site of the accident. The orientation of the image plane is adjusted correspondingly. While the medic holds the probe stationary against the accident victim, the diagnostician can manipulate the image plane remotely to survey the suspected injury area and recommend treatment from the remote location. An ultrasound system by which the user controls can be operated remotely for such a procedure is described in U.S. Pat. No. 5,715,823.

While the present invention finds great utility when embodied in transthoracic and other probes which are intended to be used from outside the body, indwelling probes may also benefit from the present invention. For example, a TEE probe may be fabricated with the ability to steer the plane orientation as described above. Multiplane (omniplane) TEE probes provide the ability to reorient the image plane by moving the probe up and down in the esophagus, twisting the insertion tube in the esophagus, articulating the probe tip, and rotating the array transducer. However, even greater versatility is provided by providing the degrees of freedom of image plane orientation of the present invention, which can also obviate the need for some of the mechanical plane adjustments presently needed for TEE probes.

Although the user controls in the embodiment of FIG. 3 are shown located on an ultrasound system user interface, it will be appreciated that the user controls may also be located on the probe. This would enable the user to manipulate the image plane orientation from the probe, without the need to access the ultrasound system scanner or cart.

The ultrasound image on the display 150 may also be accompanied by an icon which depicts the position of the image plane with respect to the probe. Icons such as those shown in the parent application 10/437,834 or similar icons may be used for this purpose.

What is claimed is:

1. A method of ultrasonically imaging with a two-dimensional array transducer a region of interest of a body which may be obstructed from the view of an image plane extending normal to the face of a transducer comprising:

placing the probe in contact with the body to create an acceptable acoustic window for the probe; and tilting the image plane from its initial orientation to the face of the transducer to image a region of interest while maintaining the probe stationary with respect to the acoustic window.

2. The method of claim 1, wherein placing further comprises using an acoustic gel to create an acceptable acoustic window.

3. The method of claim 1, wherein tilting further comprises manipulating an ultrasound system control to steer the image plane toward the region of interest while maintaining the probe stationary with respect to the acoustic window of the body.

4. The method of claim 3, wherein tilting comprises one of steering the image plane in an elevation plane different from a plane normal to the face of the transducer, or steering the plane laterally with respect to a plane centered about an axis centered with respect to the face of the transducer.

5. The method of claim 4, further comprising rotating the image plane about an axis of the image plane.

6. The method of claim 3, wherein tilting further comprises manipulating a control of an ultrasound system which is remotely located from the location of the probe.

7. The method of claim 6, wherein the control comprises a plurality of control devices.

8. The method of claim 7, wherein at least one of the control devices comprises a trackball control device.

9. A method of ultrasonically imaging with a two-dimensional array transducer probe a region of interest of a body which may be obstructed from the view of an image plane which is fixed in a normal orientation to the face of a transducer comprising:

placing the probe in contact with the body to create an acceptable acoustic window for the probe; and manipulating the image plane from its initial orientation to the face of the transducer by two or more of the actions of rotating the image plane about an axis, moving the image plane laterally from a center axis, and tilting the image plane in the elevation direction to image the region of interest, wherein manipulating is performed while maintaining the array transducer in a substantially stationary position with respect to the body.

10. The method of claim 9, wherein manipulating further comprises manipulating a control of an ultrasound system to effect the actions.

11. The method of claim 10, wherein the control comprises a plurality of control devices.

12. The method of claim 10, wherein manipulating further comprises manipulating a control of an ultrasound system which is located on the probe to effect the actions.

13. The method of claim 9, wherein manipulating further comprises manipulating a control of an ultrasound system which is remotely located from the location of the probe.

14. The method of claim 10, wherein at least one of the control devices comprises a trackball control device.

* * * * *